United States Patent
Oostendorp et al.

(10) Patent No.: US 12,158,751 B2
(45) Date of Patent: *Dec. 3, 2024

(54) SYSTEM AND METHOD FOR MONITORING MANUFACTURING

(71) Applicant: Sight Machine, Inc., San Francisco, CA (US)

(72) Inventors: Nathan Oostendorp, Ann Arbor, MI (US); Kurtis Alan Demaagd, Chelsea, MI (US); Ryan Smith, San Francisco, CA (US)

(73) Assignee: Sight Machine, Inc., San Francisco, CA (US)

( * ) Notice: Subject to any disclaimer, the term of this patent is extended or adjusted under 35 U.S.C. 154(b) by 702 days.

This patent is subject to a terminal disclaimer.

(21) Appl. No.: 17/321,140

(22) Filed: May 14, 2021

(65) Prior Publication Data
US 2021/0349455 A1    Nov. 11, 2021

Related U.S. Application Data

(63) Continuation of application No. 16/687,046, filed on Nov. 18, 2019, now Pat. No. 11,009,862, which is a
(Continued)

(51) Int. Cl.
*G05B 23/02* (2006.01)
*G05B 19/418* (2006.01)
(Continued)

(52) U.S. Cl.
CPC ... *G05B 23/0272* (2013.01); *G05B 19/41875* (2013.01); *G05B 23/0235* (2013.01);
(Continued)

(58) Field of Classification Search
None
See application file for complete search history.

(56) References Cited

U.S. PATENT DOCUMENTS

| | | | |
|---|---|---|---|
| 5,659,467 | A | 8/1997 | Vickers |
| 6,862,486 | B2 | 3/2005 | Cocco et al. |

(Continued)

FOREIGN PATENT DOCUMENTS

| | | | |
|---|---|---|---|
| CN | 1682165 A | 10/2005 |
| CN | 1791971 A | 6/2006 |

(Continued)

OTHER PUBLICATIONS

Decision of Rejection received for Chinese Patent Application No. 201680077709.9, mailed on Mar. 2, 2022, 14 pages (9 pages of English Translation and 5 pages of Official Copy).

(Continued)

*Primary Examiner* — Ryan A Jarrett
(74) *Attorney, Agent, or Firm* — DLA Piper LLP (US)

(57) ABSTRACT

A system for monitoring manufacturing includes one or more sensors and a controller in communication with the one or more sensors. The controller may include one or more processors that determine a quality metric represented by machine data collected from one or more machine data sensors and identify a correlation value between the machine data and environmental data collected from one or more environmental data sensors. The controller may further include determine if the correlation value exceeds a predetermined threshold value, and if the correlation value exceeds the predetermined threshold value, report at least one of the correlation value and the quality metric.

20 Claims, 14 Drawing Sheets

Related U.S. Application Data continuation of application No. 15/373,337, filed on Dec. 8, 2016, now Pat. No. 10,481,597.

(60) Provisional application No. 62/264,718, filed on Dec. 8, 2015.

(51) Int. Cl.
| | | |
|---|---|---|
| *G06F 16/951* | (2019.01) | |
| *G06Q 10/0639* | (2023.01) | |
| *G06Q 50/04* | (2012.01) | |
| *G08B 21/18* | (2006.01) | |

(52) U.S. Cl.
CPC ....... *G06Q 10/06395* (2013.01); *G06Q 50/04* (2013.01); *G08B 21/182* (2013.01); *G05B 2219/32191* (2013.01); *G06F 16/951* (2019.01); *Y02P 90/80* (2015.11)

(56) References Cited

U.S. PATENT DOCUMENTS

| | | | |
|---|---|---|---|
| 6,985,779 | B2 | 1/2006 | Hsiung et al. |
| 7,000,193 | B1 | 2/2006 | Impink et al. |
| 7,650,198 | B2 | 1/2010 | Dorgelo et al. |
| 7,668,186 | B1 | 2/2010 | Nelson et al. |
| 10,386,827 | B2 | 8/2019 | Enver et al. |
| 10,481,597 | B2 | 11/2019 | Oostendorp et al. |
| 11,009,862 | B2 * | 5/2021 | Oostendorp ..... G06Q 10/06395 |
| 11,340,142 | B2 | 5/2022 | Oostendorp et al. |
| 2002/0069349 | A1 | 6/2002 | Toprac |
| 2004/0181294 | A1 | 9/2004 | Deitz et al. |
| 2004/0254762 | A1 | 12/2004 | Hopkins et al. |
| 2005/0081410 | A1 | 4/2005 | Furem et al. |
| 2005/0187649 | A1 | 8/2005 | Funk et al. |
| 2005/0222813 | A1 | 10/2005 | Bjornson et al. |
| 2007/0244571 | A1 | 10/2007 | Wilson et al. |
| 2010/0027432 | A1 | 2/2010 | Gopalan et al. |
| 2010/0030544 | A1 | 2/2010 | Gopalan et al. |
| 2010/0161101 | A1 | 6/2010 | Pouyez et al. |
| 2013/0232137 | A1 | 9/2013 | Knott |
| 2014/0047107 | A1 | 2/2014 | Maturana et al. |
| 2015/0324329 | A1 | 11/2015 | Blevins et al. |
| 2016/0321594 | A1 | 11/2016 | Linde et al. |
| 2017/0102693 | A1 | 4/2017 | Kidd et al. |
| 2017/0255723 | A1 | 9/2017 | Asenjo et al. |
| 2017/0371322 | A1 | 12/2017 | Lake et al. |

FOREIGN PATENT DOCUMENTS

| | | |
|---|---|---|
| CN | 102117731 A | 7/2011 |
| CN | 102274031 A | 12/2011 |
| CN | 102575973 A | 7/2012 |
| CN | 104765344 A | 7/2015 |

OTHER PUBLICATIONS

Decision to Grant received for European Patent Application No. 16886686.1, mailed on Nov. 3, 2023, 2 pages.
Intention to Grant received for European Patent Application No. 16886686.1, mailed on Jun. 21, 2023, 9 pages.
Non-Final Office Action received for U.S. Appl. No. 17/012,334, mailed on Aug. 18, 2021, 11 pages.
Non-Final Office Action received for U.S. Appl. No. 17/724,171, mailed on May 11, 2023, 18 pages.
Notice of Allowance received for Canadian Patent Application No. 3,007,973, mailed on May 4, 2020, 1 page.
Notice of Allowance received for U.S. Appl. No. 17/012,334, mailed on Jan. 24, 2022, 8 pages.
Notice of Allowance received for U.S. Appl. No. 17/724,171, mailed on Oct. 30, 2023, 8 pages.
Office Action received for Chinese Patent Application No. 201680077709.9, mailed on Dec. 3, 2020, 17 pages (10 pages of English Translation and 7 pages of Official Copy).
Office Action received for Chinese Patent Application No. 201680077709.9, mailed on Oct. 18, 2021, 12 pages (6 pages of English Translation and 6 pages of Official Copy).
Office Action received for European Patent Application No. 16886686.1, mailed on Aug. 29, 2022, 7 pages.
Office Action received for European Patent Application No. 16886686.1, mailed on Jun. 25, 2021, 8 pages.
Corrected Notice of Allowance received for U.S. Appl. No. 15/373,337, mailed on Sep. 11, 2019, 2 pages.
Extended European Search Report received for European Patent Application No. 16886686.1, mailed on Jul. 8, 2019, 8 pages.
Final Office Action received for U.S. Appl. No. 16/687,046, mailed on Oct. 21, 2020, 11 pages.
International Preliminary Report on Patentability received for PCT Patent Application No. PCT/US2016/000127, mailed on Jun. 21, 2018, 11 pages.
International Search Report and Written Opinion received for PCT Patent Application No. PCT/US16/00127, mailed on Jun. 16, 2017, 13 pages.
Non-Final Office Action received for U.S. Appl. No. 15/373,337, mailed on Jan. 10, 2019, 20 pages.
Non-Final Office Action received for U.S. Appl. No. 15/723,016, mailed on Sep. 5, 2019, 8 pages.
Non-Final Office Action received for U.S. Appl. No. 16/687,046, mailed on Jun. 9, 2020, 13 pages.
Notice of Allowance received for U.S. Appl. No. 15/373,337, mailed on Jul. 18, 2019, 9 pages.
Notice of Allowance received for U.S. Appl. No. 15/723,016, mailed on May 11, 2020, 8 pages.
Notice of Allowance received for U.S. Appl. No. 16/687,046, mailed on Jan. 28, 2021, 9 pages.
Office Action received for Canadian Patent Application No. 3,007,973, mailed on Apr. 2, 2019, 6 pages.
Office Action received for European Patent Application No. 16886686.1, mailed on Jul. 23, 2020, 6 pages.
Extended European Search Report received for European Patent Application No. 23212513.8, mailed on Mar. 13, 2024, 8 pages.

* cited by examiner

SYSTEM AND METHOD FOR MONITORING MANUFACTURING

CROSS-REFERENCE TO RELATED APPLICATIONS

This application claims the benefit under 35 U.S.C. § 119(e) of U.S. provisional application No. 62/264,718, titled "System and Method for Monitoring Manufacturing," filed on Dec. 8, 2015, the content of which is incorporated herein by reference in their entirety for all purposes.

BACKGROUND

Modern manufacturing factories generate a steady stream of complex, heterogeneous factory data collected from various types of sensors distributed throughout the manufacturing factories. Such data may be key for improving operations and product quality, and for addressing manufacturing problems such as inefficiencies and underperformance attributed to machine downtimes, supply chain interruptions, unfavorable ambient conditions, among others. However, traditional approaches for using the data are limited and cumbersome. For example, there can be significant lag times between when a manufacturer is aware of a problem and when solutions are finally implemented. As another example, there can be difficulties in tracing problems that are detected in a final completed product to specific root causes among the many machines and processes. These difficulties are caused or exacerbated by challenges in extracting information and knowledge that may be hidden amongst diverse amount of factory data. Manufacturing problems, especially if identified too late, may require costly corrective measures, such as additional product inspections, warranty claims and recalls, reworking products, and so on. Therefore, there is a need for a faster, more real-time approach to effectively utilizing the factory data and providing actionable solutions to manufacturers for improving their operations and product quality.

This application is intended to address such issues and to provide related advantages.

SUMMARY

In general, the systems and methods disclosed herein are directed to manufacturing, and more particularly, to manufacturing analytics.

In one aspect, the present disclosure provides for a system for monitoring manufacturing includes one or more sensors and a controller in operative communication with the one or more sensors. The controller may include one or more processors and a memory that is communicatively coupled with and readable by the one or more processors. The memory may have stored thereon processor-readable instructions that, when executed by the one or more processors, cause the one or more processors to determine a quality metric represented by machine data collected from one or more machine data sensors and identify a correlation value between the machine data and environmental data collected from one or more environmental data sensors. The processor-readable instructions may further cause the one or more processors to determine if the correlation value exceeds a predetermined threshold value, and if the correlation value exceeds the predetermined threshold value, report at least one of the correlation value and the quality metric.

Various embodiments of the present system may include one or more of the following features. One or more sensors may include at least one machine data sensor and at least one environmental data sensor. The system may further include a server in operative communication with the controller and/or in operative communication with one or more remote terminals. The server may include a cloud-based data server that has one or more databases, where the databases may store machine data and environmental data that is collected from the one or more sensors. Other examples are possible.

In another aspect, the present disclosure provides for a method for monitoring manufacturing. The method may include determining a quality metric represented by machine data collected from one or more machine data sensors and/or identifying a correlation value between the machine data and environmental data collected from one or more environmental data sensors. The method may further include determining if the correlation value exceeds a predetermined threshold value, and if the correlation value exceeds the predetermined threshold value, reporting at least one of the correlation value and the quality metric.

Various embodiments of the present method may include one or more of the following features. The method may include determining that the quality metric is indicative of a substandard quality and/or reporting the quality metric based on the determination. The method may include comparing the machine data to at least one of an average value, a lower control level value, and an upper control level value and/or determining the quality metric indicates the substandard quality based on the comparison. The average value, the lower control level value, and the upper control level value may define a tolerance range for a part being manufactured and/or the substandard quality may represent the machine data exceeds the tolerance range. The method may include receiving a user request for a root cause analysis based on the determination that the quality metric is indicative of the substandard quality and/or identifying and reporting the correlation value in response to the user request. The method may include receiving a user request for at least one of the correlation value and the quality metric and/or reporting at least one of the correlation value and the quality metric in response to the user request.

In another example feature, the method may include, based on the determination that the correlation value exceeds the predetermined threshold value, determining an environmental factor, where the environmental factor indicates at least one of a humidity reading, temperature reading, and pressure reading represented by the environmental data, and/or reporting the environmental factor. The method may include analyzing the environmental data and the machine data using a regression analysis to identify the correlation value. The predetermined threshold value may include a minimum correlation factor that is based on user input received during an initial setup procedure. The method may include retrieving data representing at least one of the environmental data and the machine data from a network database. The method may include determining a trend line having a plurality of points representing the machine data over at least one of a period of time and a number of machine parts.

In yet another example feature, the method may include determining an average value for the machine data, determining if one or more of the plurality of points on the trend line cross the average value more than a predetermined number of times, and/or if the one or more points cross the average value more than the predetermined number of times, initiating an alert message that the one or more points are fluctuating above or below the mean value. The method may include determining the one or more points exceed a tolerance range more than a predetermined number of times, where the tolerance range may be defined by a lower control level value and an upper control level value, and based on the determination, generating an alert message indicating that the one or more points exceed the tolerance range. The method may include determining an average value and a standard deviation based on the machine data, analyzing the machine data by applying one or more Nelson rules and at least one of the average value and the standard deviation, determining an anomaly situation based on the analysis, where the anomaly situation indicates a violation event of the one or more Nelson rules, and/or initiating an alert message indicating the determined anomaly situation.

In still another example feature, the method may include determining an outcome variable based on the correlation value, where the outcome variable includes a variable type that is at least one of a categorical variable and an ordinal variable, and reporting the outcome variable. The variable type of the outcome variable may be based at least in part on a user request for a root cause analysis. The method may include mapping the machine data to one or more particular manufactured parts, and/or reporting the one or more particular manufactured parts along with at least one of the correlation value and the quality metric. Further, the method may include optimizing a monitored assembly line based on the correlation value by determining one or more parallel subassembly processes of the monitored assembly line and prioritizing the one or more parallel subassembly processes in the monitored assembly line based at least in part on the environmental data and the machine data so that a production time length of the monitored assembly line is reduced. Other example features of the method may be contemplated.

In another aspect, the present disclosure provides for a system for monitoring manufacturing. The system may include one or more processors and a memory communicatively coupled with and readable by the one or more processors. The memory may have stored therein processor-readable instructions that, when executed by the one or more processors, cause the one or more processors to determine a quality metric represented by machine data collected from one or more machine data sensors and/or identify a correlation value between the machine data and environmental data collected from one or more environmental data sensors. The processor-readable instructions may cause the processor to determine if the correlation value exceeds a predetermined threshold value, and if the correlation value exceeds the predetermined threshold value, report at least one of the correlation value and the quality metric. Other example features of the system may be contemplated, including one or more of the various features described above in regard to the method.

In yet another aspect, the present disclosure provides for a non-transitory computer-readable medium storing one or more programs. The one or more programs may include instructions that, when executed by one or more processors of an electronic device, cause the electronic device to monitor manufacturing by determining a quality metric represented by machine data collected from one or more machine data sensors and/or identifying a correlation value between the machine data and environmental data collected from one or more environmental data sensors. The instructions when executed cause the electronic device to determine if the correlation value exceeds a predetermined threshold value, and if the correlation value exceeds the predetermined threshold value, report at least one of the correlation value and the quality metric. Other example features of the non-transitory computer-readable medium may be contemplated, including one or more of the various features described above in regard to the method.

BRIEF DESCRIPTION OF THE FIGURES

The present application can be best understood by reference to the following description taken in conjunction with the accompanying drawing figures, in which like parts may be referred to by like numerals.

FIG. 5 shows a screenshot of machine data arranged in a tabular format, according to various embodiments of the present invention;

FIG. 7 shows a screenshot of machine data including images of a corresponding part or machine, according to various embodiments of the present invention;

FIG. 12 shows a screenshot of a message center, according to various embodiments of the present invention;

FIG. 13 shows a screenshot of a user account configuration screen, according to various embodiments of the present invention.

Figure 1:
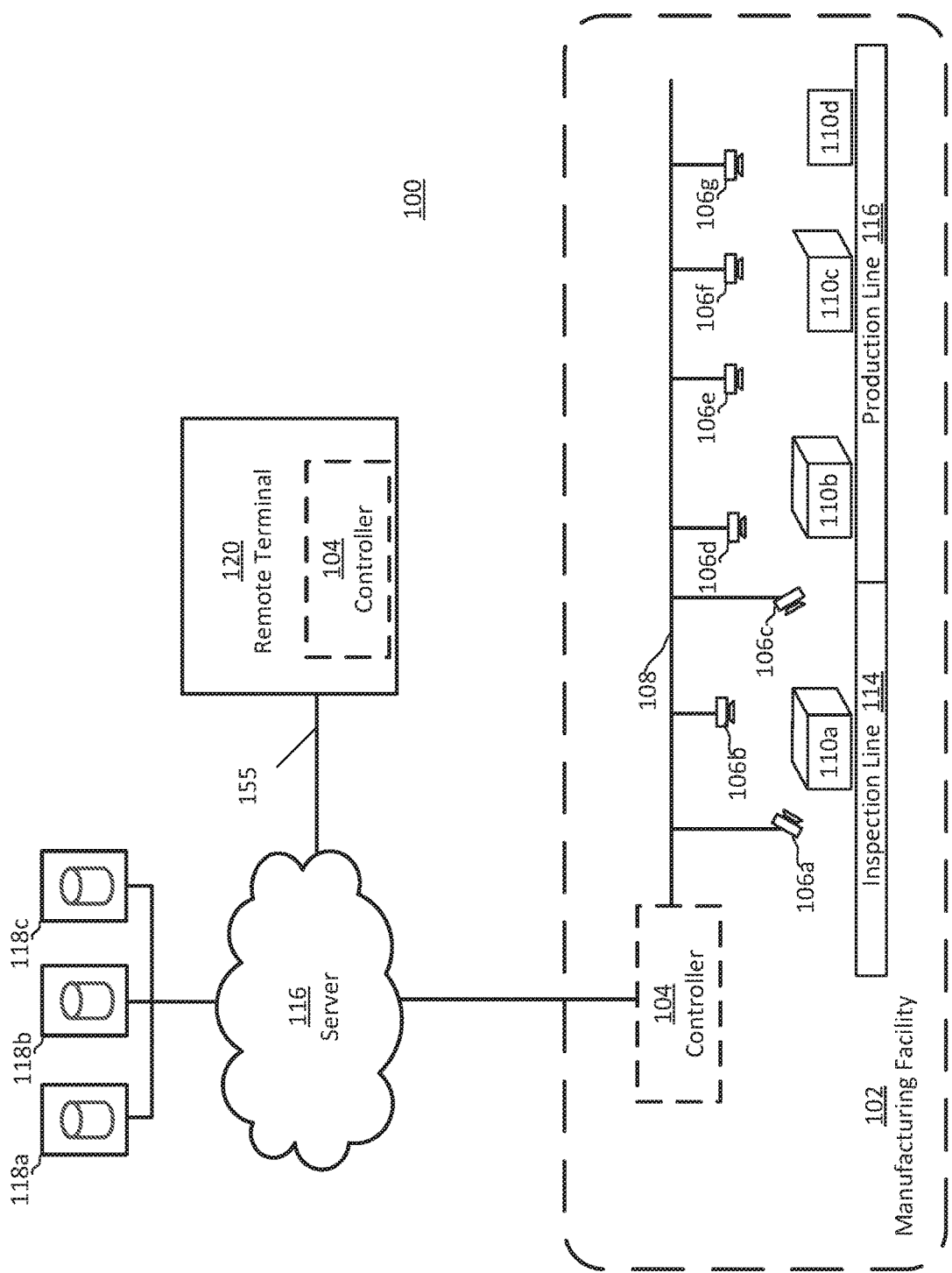
FIG. 1 shows a schematic diagram of a system for monitoring manufacturing, according to various embodiments of the present invention.

It is noted that any of the elements and/or steps provided in the block diagrams, flow diagrams, method diagrams, and other illustrations of the figures may be optional, replaced, and/or include additional components, such as combined and/or replaced with other elements and/or steps from other figures and text provided herein. Various embodiments of the present invention are discussed below, and various combinations or modifications thereof may be contemplated.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Techniques described herein are performed by software objects in some embodiments. For purposes of this disclosure, software objects may be instantiated and resident in memory. In some embodiments computer-executable programs and corresponding instructions are provided to create and process software objects.

Manufacturers are concerned with high efficiency production processes and product quality. Important to addressing these concerns is the stream of factory data that is generated by manufacturing equipment, machines, and tools. The present systems and methods disclosed herein provide for an improved approach for monitoring manufacturing through an integrated system that collects the factory data, analyzes the data, and presents the data and analytics. In practice, the present systems and methods may provide timely and actionable information that can be implemented by the manufacturers for improving their production processes and product quality. In doing so, the present systems and methods may use the factory data to pinpoint manufacturing problems and their root causes in an efficient manner.

As described further in succeeding paragraphs, factory data, which may also be referred to herein as "parts and process data," "manufacturing data," and "production data," among other terminology, may be collected from any number of varying sources throughout the manufacturing factory, such as sensors, cameras, text, barcodes, audio files, and laboratory equipment. A challenge to using factory data as a tool for improving manufacturing lies within the inherent complexity of the raw data, which may be high in volume, highly varied, and produced at high velocity. The present systems and methods overcome traditional limitations associated with using the factory data and provide a more robust approach for monitoring manufacturing. For instance, the present systems and methods may collect and interpret the data with context and meaning in real-time and/or near real-time to provide actionable solutions quickly, in practice, the present systems and methods may identify, prevent, and/or resolve manufacturing problems by identifying why an assembly line or subassembly line is down, which may result, for example, from a lack of materials, machine malfunction, missing personnel, and so on. Further, the present systems and methods may correct the problem, assess how quickly the problem is corrected, identify root causes of the problem, and identify trends for predicting future problems. It is contemplated that by quickly and precisely discovering and addressing underlying problems, manufacturers may improve their competitive position through the benefits associated with improved operations and product quality.

Turning to FIG. 1, an example system 100 for remotely monitoring a manufacturing factory 102 is shown. The manufacturing factory 102 may include one or more controllers 104 in operative communication with one or more sensors 106a-g via a data network 108. The sensors 106a-g may collect data from a plurality of machines, product stages, assembly lines, and/or subassembly lines. For simplicity of illustration, FIG. 1 shows the plurality of sensors 106a-g monitoring a plurality of machines and/or product checkpoints, schematically represented as products 110a-d, at a production assembly line 112 and an inspection assembly line 114. It is noted that any number of products, production stages, sensors, wireless and/or wired communication channels may be contemplated.

The controller 104 at the manufacturing factory 102 may be in uni- or bi-directional communication with a server 116 that includes and/or otherwise accesses one or more databases 118a-c for storing the sensed factory data, data analytics, activity logs, and so on. A remote terminal 120 may be in operative communication with the manufacturing factory 102 via the server 116. It is contemplated that one or more steps of the monitoring manufacturing techniques described herein may be provided by the controller 104 located at the manufacturing factory 102 and/or the remote terminal 120, at the server 116, and/or any combination thereof. It is noted that while remote monitoring is being shown, one or more features of the present techniques may additionally and/or alternatively be performed on-site. Further, additional and/or alternative communication channels, operating entities or elements, and/or interactions may be contemplated.

The sensors 106a-g may include analog and/or digital sensors, such as bio sensors, chemistry and/or composition sensors, current and/or power sensors, air quality sensors, gas sensors, Hall Effect sensors, lightness level sensors, optical sensors, pressure sensors, temperature sensors, ultrasonic sensors, proximity sensors, door status sensors, motion tracking sensors, humidity sensors, visible and infrared light sensors, cameras, and so on. For example, a door status sensor may detect an open and/or closed state of a door, in addition or alternative to auto-opening and/or auto-locking of the door. Cameras may capture images for visualizing and/or analyzing a particular factory and/or manufactured part. Such sensors may collect data that is further used individually and/or in combination to determine various environmental factors, and/or assembly line operating statuses and/or conditions. For example, the sensor data may be utilized to determine if an assembly line is shut down and/or operating properly.

As shown in FIG. 1, the sensors 106a-g may send a signal to the controller 104 via data network 108, which may include one or two-way wireless communications and/or physical wiring channels, WiFi, Bluetooth, and/or other radio frequencies. In some cases, data collected by the sensors may be stored at the databases 118-c provided on a cloud, such as a cloud server 116, that is accessible through the web and allows for remote data storage, backup, and/or processing. In some examples, the controller 104 includes one or more programmable logic controllers (PLCs), software, and/or microprocessors, which may collect, process, analyze, and/or present the data according to various methods described herein. The controller 104 may trigger one or more flags and/or notifications related to the monitored manufacturing, and/or can automatically reconfigure one or more processes in an assembly line according to one or more optimization rules. For example, based on the collected sensor data, the controller 104 may not only report an underperforming machine, but also automatically reconfigure one or more stages of the machine in an effort to reduce system downtime. In another aspect, automatically performing such adjustments may further increase safety by eliminating a need for human interaction with the machine. It is contemplated that any of the techniques disclosed herein may be performed by one or more controllers 104 and/or at the server 116.

As mentioned above, server 116 may include a physical server and/or a cloud server. In some examples, one or more databases 118a-c are stored in a cloud server and include data collected from an assembly line, subassembly line, and/or may be modular representing each of a manufacturer's different assembly lines, factories, and/or factory locations, locally and/or globally. In an exemplary embodiment, the system 100 collects the production data at the controller 104 and sends the collected data to the cloud server 116 which analyzes the data using various machine learning algorithms, and other data conditioning and analysis techniques, and presents the data through a graphical user interface as described below. Analytics performed on the manufacturing data may include transformations, calculations, and functions on raw data using models representing manufacturing processes and parts. Such manufacturing analytics applications provide insight on, for example, part quality, process performance, OEE drill-down, root cause analysis, anomaly detection, traceability, real-time SPC, and predictive maintenance, among others. In another aspect, the general manufacturer can map or otherwise correlate part data with certain parts, and/or machine data with certain machines that manufactured certain parts. For example, if the general manufacturer identifies a machine problem with a particular machine, the present systems and methods may identify which particular parts and/or overall products may have been equipped with the faulty product. The cloud server 116 and/or the controller 104 may provide the data and analysis results to manufacturers through various web frameworks. Such web frameworks may include protocols that support the transfer of data using HTML, JavaScript, and/or JSON, so that the remote terminal 120 can display visualizations of the data through a user interface and update those visualizations as new data is computed by the server 116 and/or the controller 104.

Controller 104 and/or server 116 may also provide or include various application programming interfaces ("APIs") for storing the data into databases 118a-c and other data management tools. APIs may aid further in retrieving data from the databases 118a-c for various data management systems, including software as a service ("SaaS") applications that provide access to the database and/or can pull or otherwise retrieve data from the database and create metrics using such data. As noted above, such applications may be provided via web browsers to allow for remote operations management for the manufacturer. It is contemplated that the system 100 may implement a plug-in architecture along with the APIs for data acquisition to provide a plug and play connection with the sensors and/or other data sources, such that unique data types, such as from homegrown manufacturing execution systems ("MES") and/or custom factory information technology ("IT") systems, can be easily integrated.

Various types of communications channels between the entities shown in FIG. 1 may be contemplated, including uni-directional and/or bi-directional, wired and/or wireless communications. Merely by way of example, data network 108 may include an industrial protocol network, such as OPC, Modbus, ProfiNet, and the like. In other examples, any of the communication channels may be a dedicated conduit communication, such as a universal serial bus (USB), IEEE 802 (Ethernet), IEEE 1394 (FireWire), or other high speed data communication standard. Other examples are possible.

Figure 2:
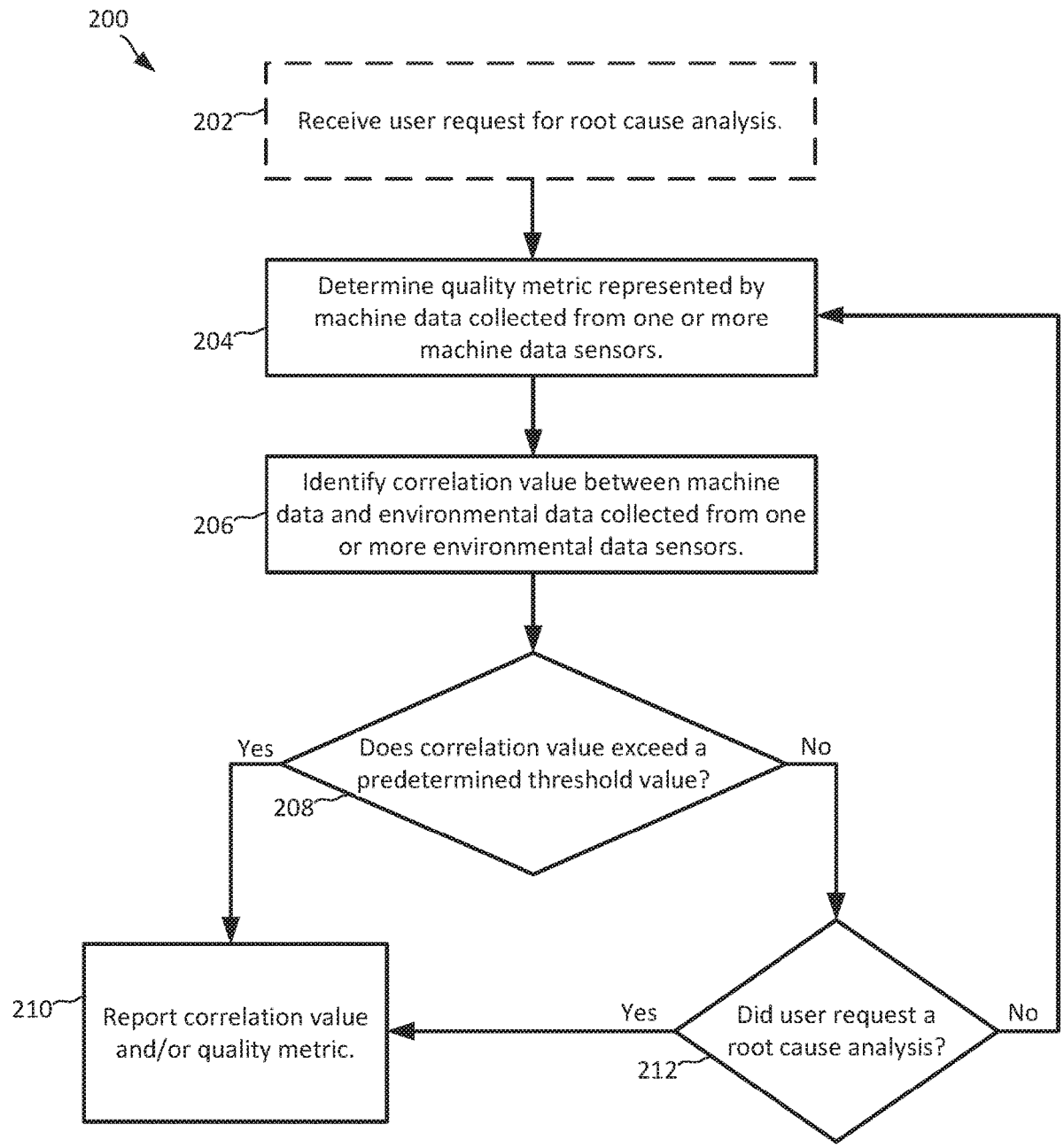
FIG. 2 shows a method for monitoring manufacturing, according to various embodiments of the present invention.

Turning now to FIG. 2, an example method 200 for monitoring manufacturing is shown. It is contemplated that one or more steps shown in the method 200, and/or any other methods disclosed herein, may be performed by the controller 104, at the server 116, and/or a combination thereof. Further, some steps disclosed herein may be rearranged, removed, and/or modified. Additional steps may be contemplated.

As shown in FIG. 2, the method 200 may include receiving a user request for a root cause analysis (step 202). For instance, the user request may be initiated upon receiving a manufacturer's input that is directed to determining an underlying cause for a machine down or an ascertained poor product quality level. The method 200 may include determining one or more quality metrics represented by machine data collected from one or more machine data sensors (step 204), such as one or more of the sensors 106a-g shown in FIG. 1. Such quality metrics may include, merely by way of example, a total number of defects, defect frequency, number of defects by shift, number of defects by type of defect, and defect correlation to other recorded factors. Other quality metrics may include, for example, a mean value and standard deviation calculated based on a current measurement received from the controller 104 and/or other measurements that were previously received from the controller 104, comprehensive pass or fail results, rejection rate, total number of failures, substandard quality or other particular quality levels, and others. In further aspects, a determined quality metric may include results generated by statistical processing including, for example, regression analysis, distribution analysis, or Nelson rules of process control and other control charting techniques, as described further below. In a specific example, quality metrics may be determined to indicate a substandard quality based on one or more data points exceeding a tolerance range. Such tolerance ranges may be defined by an average value, lower control level value, and/or upper control level value for a part being manufactured.

The method 200 may include identifying a correlation value between the machine data and environmental data that is collected from one or more environmental sensors, which may include any example sensors 106a-g described previously (step 206). The method 200 may further include determining if a correlation value exceeds a predetermined threshold value (step 208), which may be based on user input received during an initial setup procedure. If the determination is positive, the method 200 may include reporting the correlation value and/or the quality metric (step 210). If the correlation value does not exceed the predetermined threshold value, the method 200 may include determining if a user request had initiated the root cause analysis (step 212). If a user request had initiated the root cause analysis, the correlation value and/or the quality metric may be reported (step 210). Examples of reporting may include generating text and/or e-mail messages, pop-up notifications, logging the report in a spreadsheet or other database, and so on. If the correlation value does not exceed the predetermined threshold value, the method 200 may return to step 204 to continue determining one or more other, same or different, quality metrics. In another aspect, after reporting the correlation value and/or quality metric at step 210, the method 200 may loop back to step 204 to continuously analyze the factory data. Other examples and variations are possible. Merely by way of example, method 200 may further include determining the predetermined threshold value based on available manufacturing data and/or receiving such values based on available manufacturing data and setting such values as the predetermined threshold value.

Figure 3:
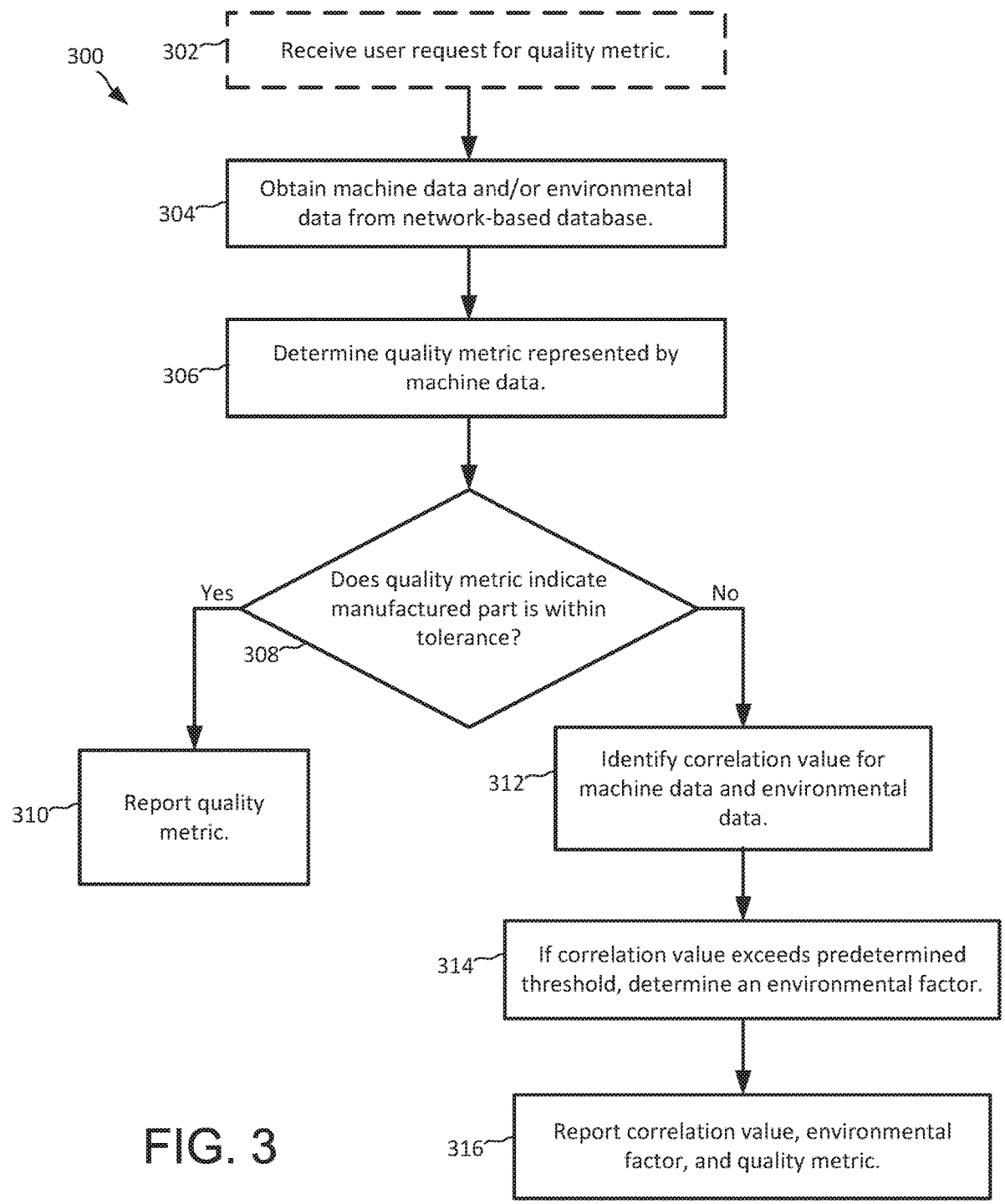
FIG. 3 shows another method for monitoring manufacturing, according to various embodiments of the present invention.

Turning to FIG. 3, another method 300 for monitoring manufacturing is shown. The method 300 may include receiving a user request for a quality metric (step 302), such as any of the quality metrics described previously. The method 300 may include obtaining machine data and/or environmental data from a network-based database (step 304), such as one or more of the databases 118a-c hosted on or by the server 116. The method 300 may further include determining a quality metric that is represented by the machine data (step 306) and/or determining if the quality metric indicates that a manufactured part is within a tolerance range (step 308). If the determination is within the tolerance range, the method 300 may include reporting the quality metric (step 310) and/or other information indicating that the manufactured part is within the tolerance range. If the quality metric indicates that the manufactured part is outside of tolerance, the method 300 may include identifying a correlation value for the machine data and environmental data (step 312), which may be acquired from the server 116. If the correlation value exceeds the predetermined threshold, the method 300 may include determining an environmental factor (step 314), such as a humidity, pressure, temperature, and/or lightness level, and reporting the correlation value, environmental factor, and/or the quality metric (step 316).

Figure 4:
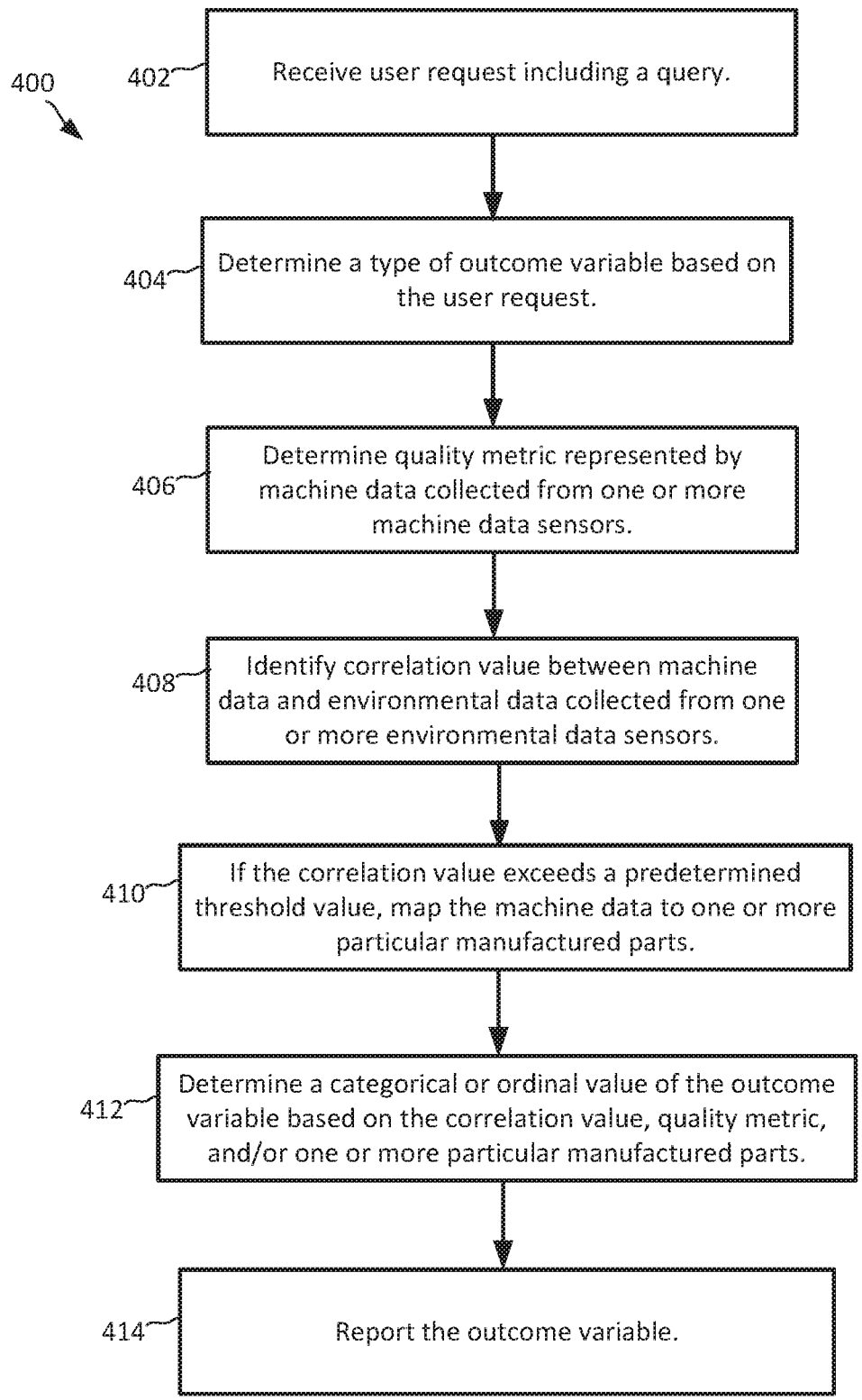
FIG. 4 shows yet another method for monitoring manufacturing, according to various embodiments of the present invention.

Turning to FIG. 4, another example method 400 for monitoring manufacturing is shown. The method 400 may include receiving a user request that includes a query (step 402) for a categorical and/or ordinal state in regard to a particular type of machined part, machine, and/or assembly line or process. The method 400 may include determining a type of outcome variable based on the type of query (step 404), such as a categorical outcome variable and/or an ordinal outcome variable. The method 400 may include determining a quality metric represented by machine data that is collected from one or more machine data sensors (step 406). The method 400 may include, identifying a correlation value between machine data and environmental data (step 408), which may be retrieved from a cloud-based data network such as the server 116 shown in FIG. 1. The method 400 may further include determining if the correlation value exceeds a predetermined threshold, and if so, mapping the machine data to one or more particular machine parts (step 410). Further, the method 400 may include determining a categorical and/or ordinal value of the outcome variable based on the correlation value, quality metric, and/or one or more particular manufactured parts (step 412). The method 400 may further include reporting the outcome variable (step 414). Other examples are possible.

FIGS. 5-13 provide various example screenshots of a user interface that may be used and/or provided by the server 116 and/or controller. In some examples, the various screenshots are provided as a part of a manufacturing monitoring application that is accessible to manufacturers through a web interface, web browser, and/or provided as a specialized, licensed software. While particular features of particular screenshots are being shown, it is noted that any of the features shown in the figures and described below may be interchanged, combined, optional, and/or located on multiple or other screenshots. Additional features may be contemplated and added. Various combinations and examples are possible.

Figure 5:
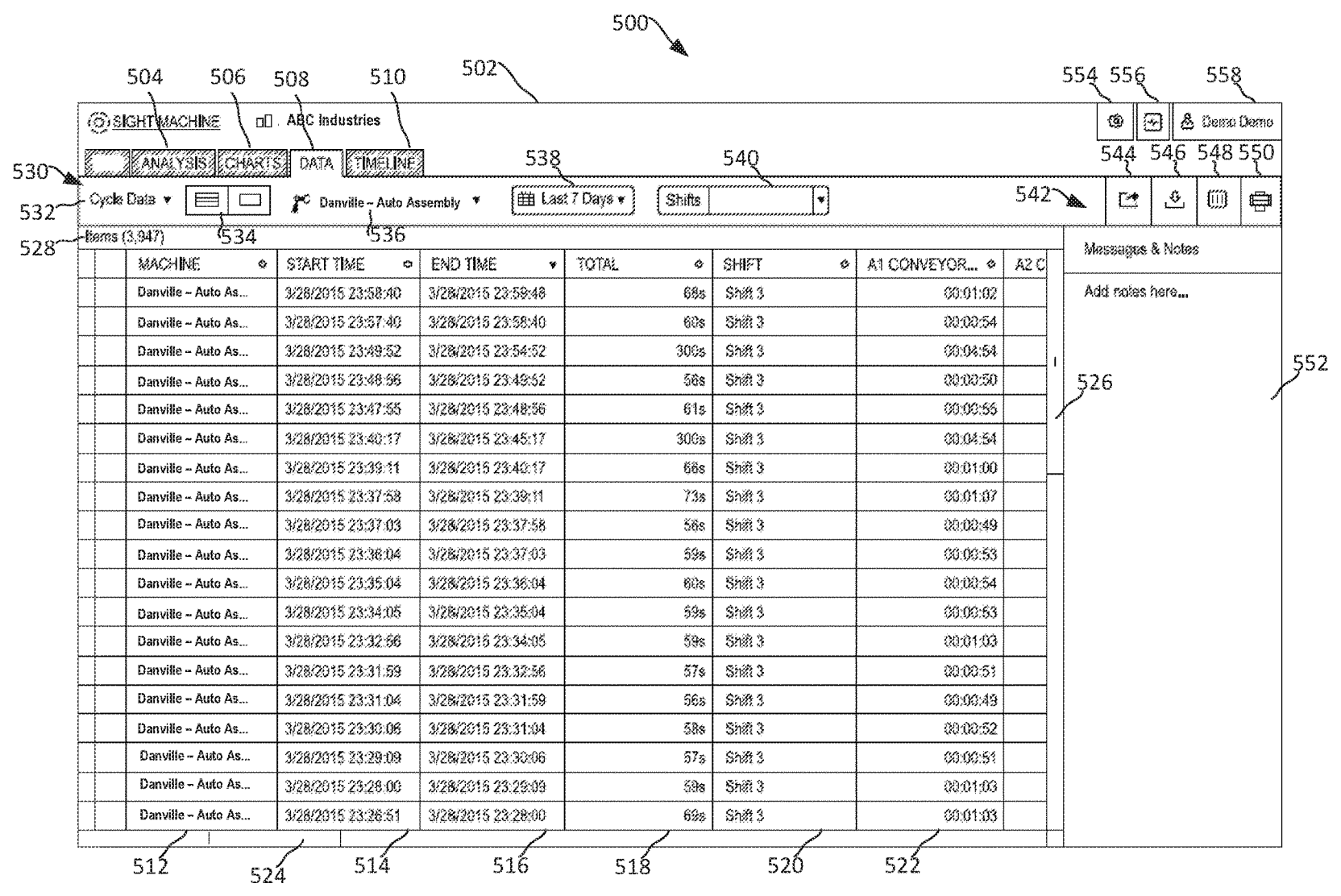

Turning to FIG. 5, an example screenshot 500 of manufacturing data displayed in a tabular format by a user interface (UI) 502 is shown. The UI 502 may include a plurality of tabs for presenting information collected from the sensors 106*a-g*, such as an analysis tab 504, charts tab 506, data tab 508, timeline tab 510, and/or other tabs that may be added. As shown in FIG. 5, the data tab 508 may display timing data for a plurality of machines in a tabular "spreadsheet" style that includes data columns of individual machine identifiers or names 512, operating start time 514, operating end time 516, total length of operating time 518, shift number 520, conveyor time 522, and additional rows and columns showing additional fields of data may be displayed by scrolling horizontal and/or vertical scroll bars 524,526. An item count 528 may display a total number of machines being monitored and/or having data available for presentation in the data tab 508. A menu bar 530 may be provided for various data types 532 to be filtered or displayed, such as cycle data, display format options 534, and/or particular machine type options 536 which may be expanded for more options by a drop down menu. Such drop-down functionalities may narrow down the high volumes of data accessible by the scroll bars by grouping data according to shared features, such as cycle number and/or machine type.

The menu bar 530 may further include a time period selection 538 for view, such as the past 24 hours, past 7 days, past 30 days, past 90 days, and so on. A work shift drop down box 540 may allow for selection of a particular shift. Further, the UI 502 may provide a toolbar 542 with an export option 544 to export the data to various file formats, including CSV and XLSX, a download option 546 for downloading data and/or other files to be displayed in the UI 502, a delete option 548 for erasing selected or highlighted data, and/or a print option 550 for printing the data being displayed. A messages and notes section 552 may be provided to record annotations from logged in users. In an example, the messages and notes section 552 includes rows pertaining to particular machines such that each machine may be marked up with notes. The UI 502 may also implement one or more different colors for conveying information, such as highlighting rows and/or columns, highlighting fields, coloring font, and so on. Merely by way of example, the UI 502 may utilize red font and/or row shading for fields where tolerances are violated. In another aspect, the UI 502 may present a UI settings 554, user statistics 556, and/or a user profile 558 which may be selected and expanded to show further information and/or options.

Figure 6:
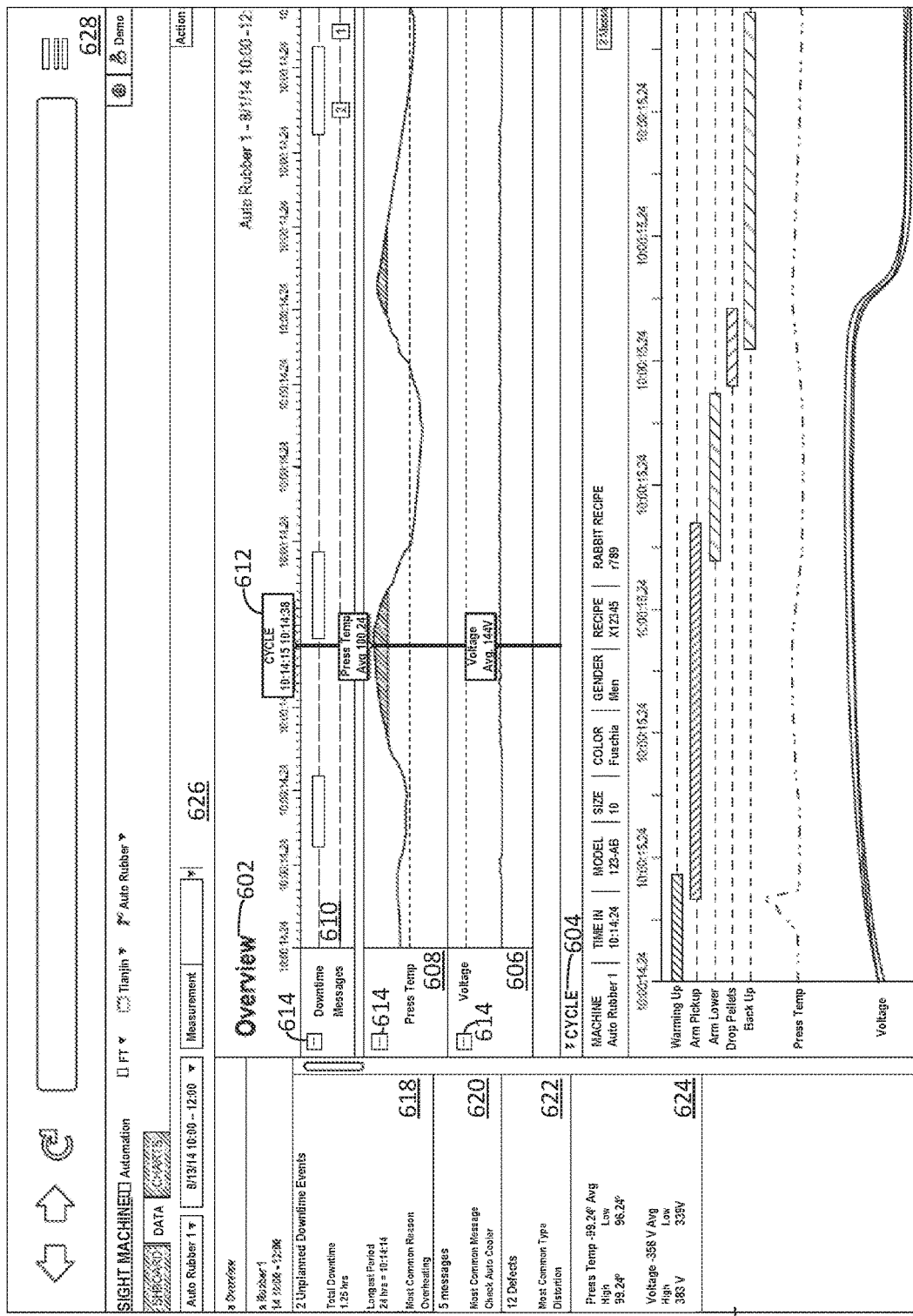
FIG. 6 shows a screenshot of machine data arranged in a timeline format, according to various embodiments of the present invention.

FIG. 6 depicts an exemplary screenshot of manufacturing data viewed in a timeline format according to various embodiments. Data tab 600 provides a visual representation of machine state longitudinally, e.g., overview timeline 602, and at a per data-point level, e.g., cycle timeline 604. Overview timeline 602 may illustrate any sensed data or messages, such as voltage 606, press temperature 608, and downtime messages 610 over time. Overview timeline 602 is further navigable by sliding or repositioning selection bar 612 to select a particular cycle or timestamp for display in cycle timeline 604. Cycle timeline 604 may provide additional details for a selected timestamp. Values that move outside of tolerance may be shaded to indicate issues, as shown in press temperature 608 of overview timeline 602. Overview timeline 602 may also represent any time a machine is not operational, and/or programmable logic controller errors or events, as shown in downtime messages 610 graphs. Any of the overview timelines 602 may be collapsed and/or expanded upon user selection of the timeline-specific icons 614. Cycle timeline 604 includes binary timings and analog values, as well as any textual input for that cycle. The timeline format of FIG. 6 further provides sidebar 616 to allow for browsing to specific events, such as particular downtime events 618, messages 620, defects 622, and/or sensor readings 624. Further, the timeline format may allow for filtering of data using filter toolbar 626 to narrow down data for display in the overview timeline 602 and cycle timeline 604. As shown in FIG. 6, the timeline format may be provided as a graphical user interface through a web browser 628.

Figure 7:
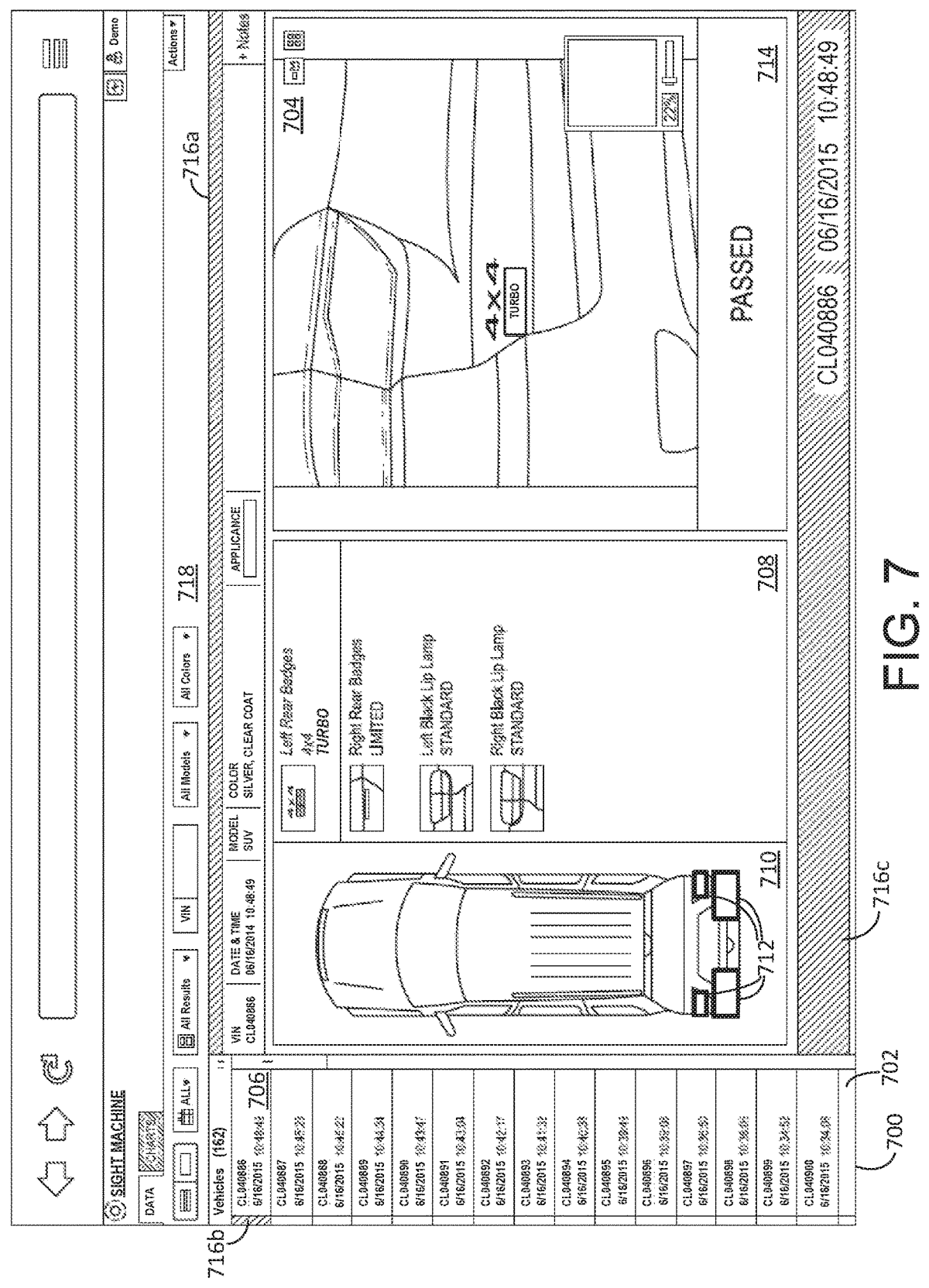

FIG. 7 depicts an exemplary screenshot of manufacturing data viewed in terms of an image of a part or machine according to various embodiments. Data tab 700 allows for browsing of archived visual assets in a database, such as sidebar database 702, which allows for specific parts or cycles to be displayed. A plurality of images 704 corresponding to a particular asset 706 selected from the sidebar database 702 may be associated with either parts or machine cycles and selected from an images list 708. In practice, machine data may be mapped to one or more particular manufactured parts, and may be reported with one or more other metrics, such as correlation values and/or quality metrics. A diagram 710 of a selected vehicle or asset 706 may map where sensors 712, such as cameras taking the images 704, are focused on a part or machine. Image and other type of inspections may be highlighted with a banner 714 indicating a green ("pass"), red ("fail"), or gray ("N/A"). One or more screen border segments 716a,b,c may be colored similarly to show overall pass or fail state for a particular part or machine cycle. Further, a filter toolbar 718 may allow for browsing or filtering to specific parts shown in the sidebar database 702 and/or the images list 708.

Figure 8:
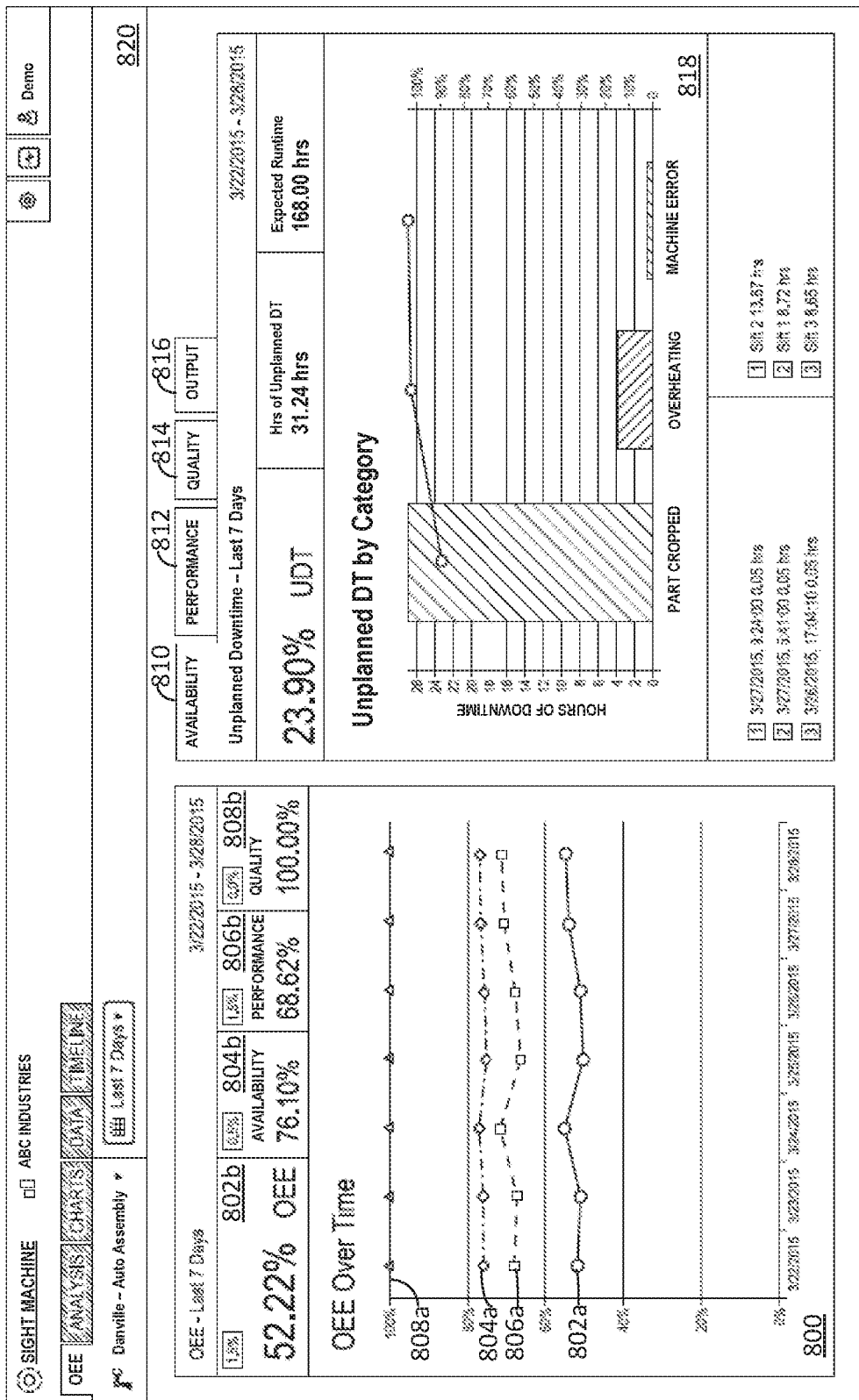
FIG. 8 shows a screenshot of a dashboard view of overall equipment effectiveness, according to various embodiments of the present invention.

FIG. 8 depicts an exemplary screenshot of a dashboard view of overall equipment effectiveness ("OEE") according to various embodiments. A line graph 800 showing performance levels of overall performance 802a, availability 804a, performance 806a, and quality 808a for a machine or machine type may be provided along with their corresponding values 802b, 804b, 806b, 808b. A tabbed view of availability 810, performance 812, quality 814, output 816, and/or other subcomponents of OEE may show drill down elements. For example, the availability tab 810 illustrates a bar graph 818 for unplanned downtime by categories including part cropped, overheating, and machine error. Such interactive charts allow drill down by day, machine, defect or downtime reason, and so on. Data shown in the OEE dashboard view may be selected for a particular machine or time period, such as 7-day period, calendar week, last 30 days, calendar month, year-to-date (YTD), and so on, from one or more drop-down menus provided on a filter toolbar 820. In some cases, the OEE view, along with any combination of other views, may be utilized for optimizing a monitored assembly line based on a correlation value. Such optimization may include determining one or more parallel subassembly processes of the monitored assembly line and/or prioritizing the one or more parallel subassembly processes in the monitored assembly line in order to reduce production time length Other examples are possible.

Figure 9:
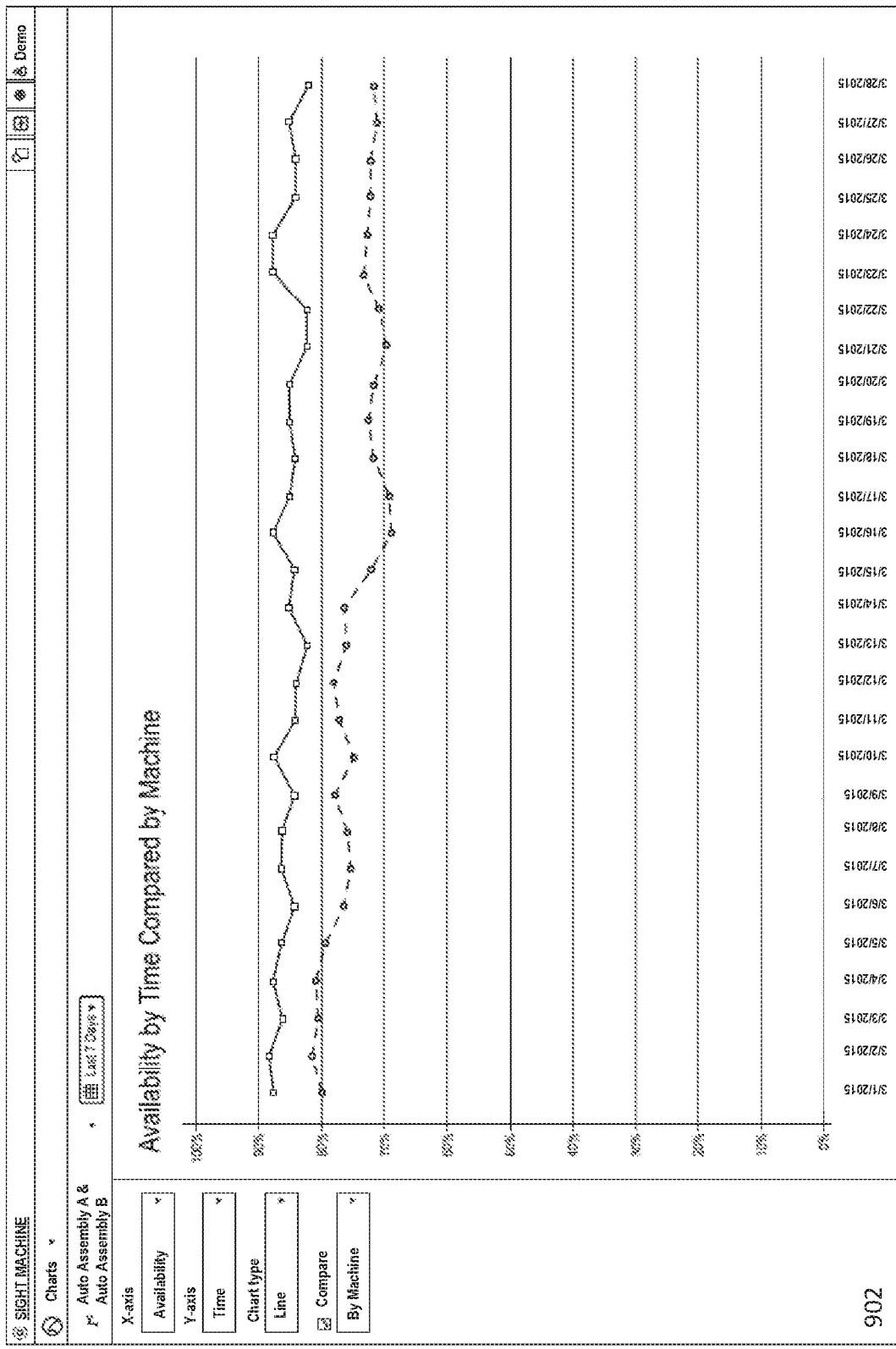
FIG. 9 shows a screenshot of machine data arranged in a chart view, according to various embodiments of the present invention.

FIG. 9 depicts an exemplary screenshot of a chart view of manufacturing data according to various embodiments. Chart view 900 allows simple data visualization of raw and aggregated characteristics. A chart features sidebar 902 may receive user selection for setting a x-axis data, y-axis data, chart type, and/or provide a compare feature for comparing data from different parts or cycles. It is contemplated that individual reports may be linked to in the application and may be exported in PDFs or generated for e-mail reports. Machine/parts can be selected individually or in sets for comparison or aggregate metrics.

Figure 10:
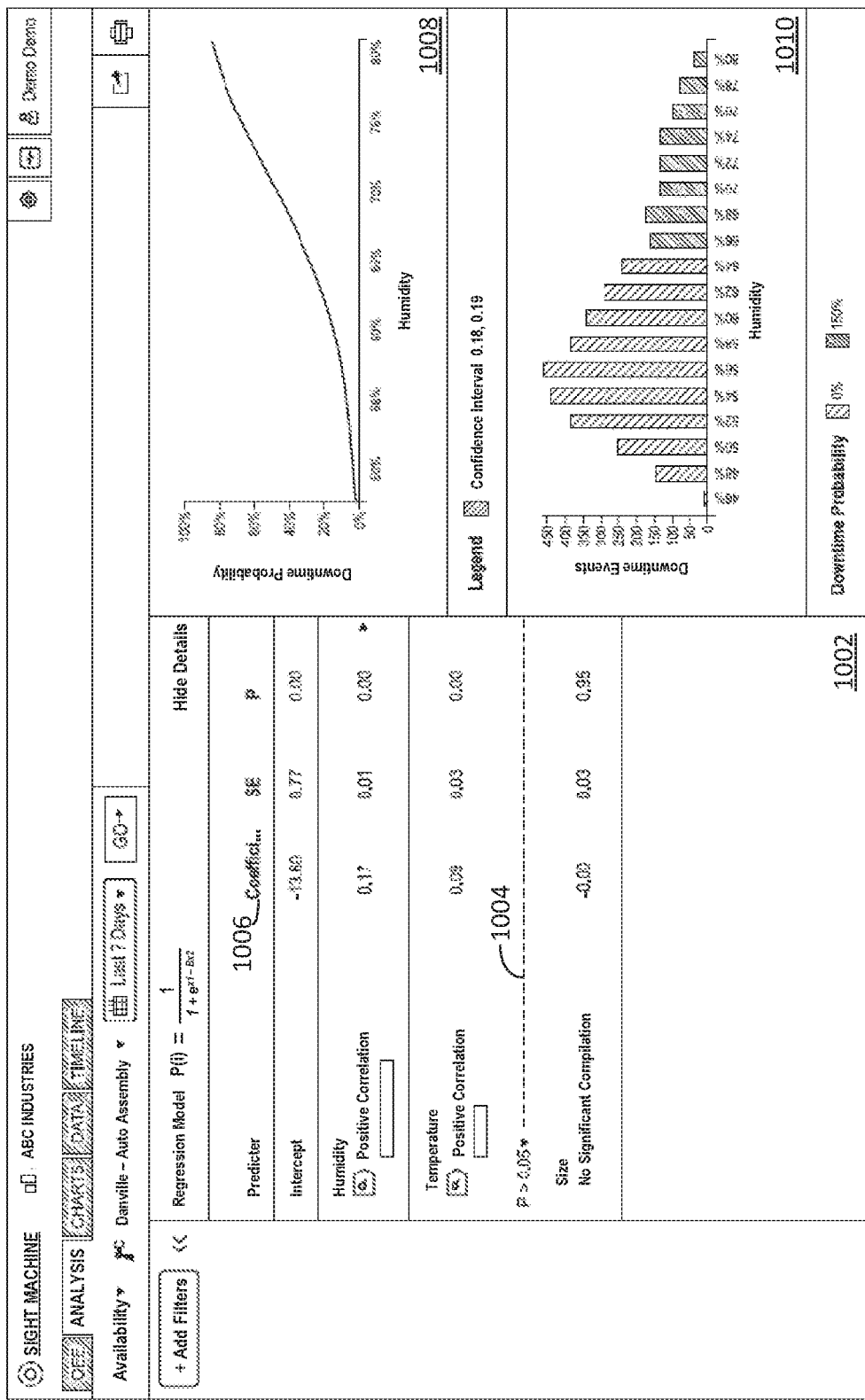
FIG. 10 shows a screenshot of a root cause analysis tool, according to various embodiments of the present invention.

FIG. 10 depicts an exemplary screenshot of a root cause analysis tool according to various embodiments. The tool provides an analysis interface 1000 that allows for explorations of correlations in raw machine and/or part data. A regression model 1002 may be automatically selected based on inputs, e.g., categorical or continuous inputs, and outputs, e.g., categorical, continuous, and/or events. Such inputs, and/or general initiation of a root cause analysis, may be selected or otherwise input by a user upon initiating one or more soft keys provided in the analysis interface 1000. In some cases, a regression analysis may be used to analyze environmental data and machine data to identify a correlation value. Machines and/or parts may be selected individually or in sets for comparison and/or aggregation. In some cases, as shown in FIG. 10, most statistically significant effects, such as those having P value<0.05, are shown above a dotted line 1004 or other separator, and sorted by correlation coefficient 1006 in ascending or descending order. Relationship plot 1008 may illustrate relationships between variables, such as humidity and downtime probability, and a corresponding probabilistic histogram 1010 may be provided.

Figure 11:
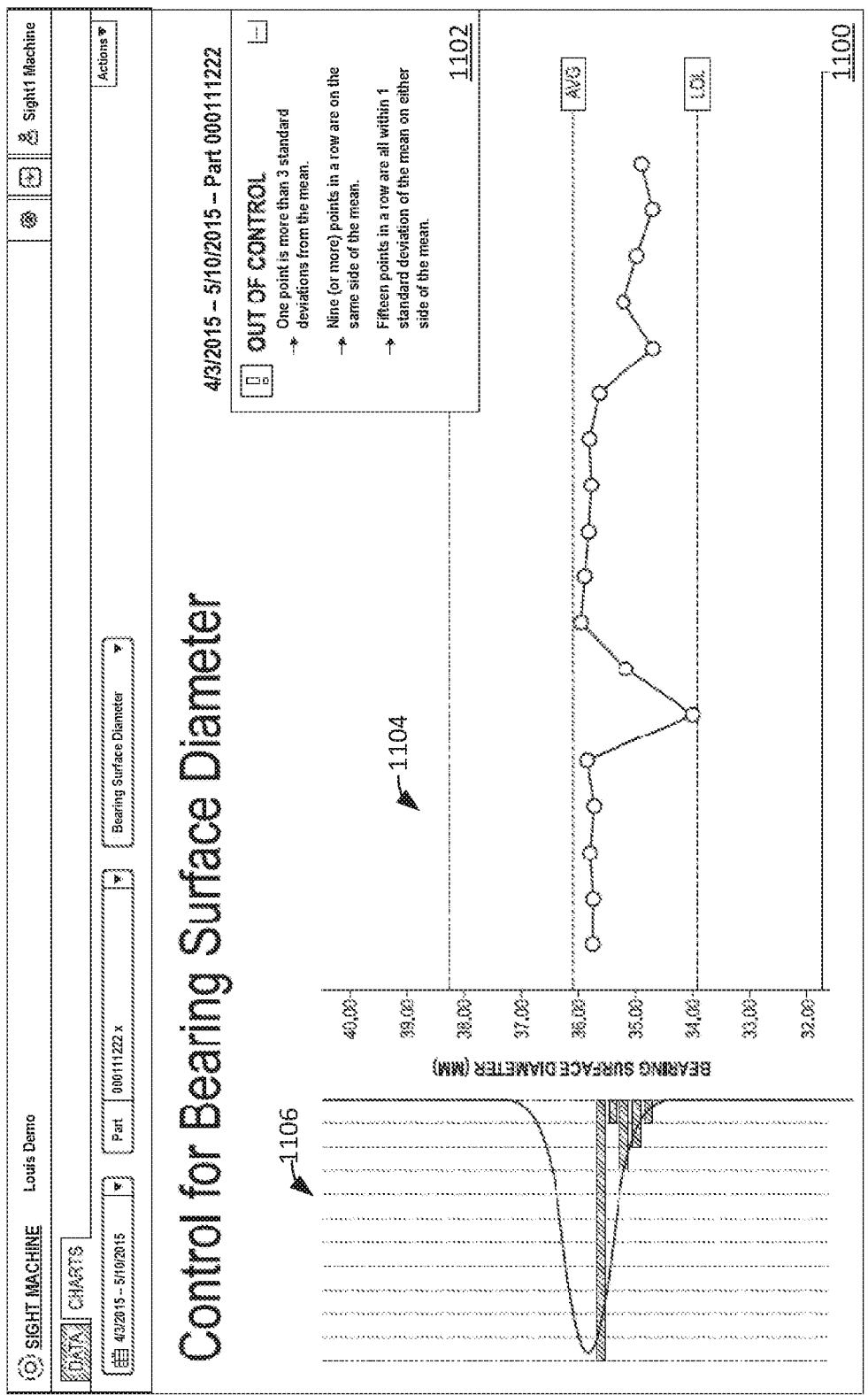
FIG. 11 shows a screenshot of a real-time statistical process control tool, according to various embodiments of the present invention.

FIG. 11 depicts an exemplary screenshot of a real-time statistical process control tool according to various embodiments. The process control tool 1100 may automatically and/or in response to user instruction test new measurements against statistical process control-based heuristics ("SPC heuristics"). Based on the testing, process control tool 1100 may provide a pop-up box alert 1102 indicating any violations that cause the alert 1102 to be generated, a trend plot 1104 showing a plurality of data points representing machine and/or environmental data, and/or a corresponding distribution histogram 1106 showing measurements from a part and/or machine, such as a bearing surface diameter. As shown in example FIG. 11, trend plot 1104 may include one or more trend lines relative to an average level, lower level, and/or upper level threshold. Such average level, lower level, and/or upper level threshold values may be determined by user input and/or generated based on available machine data. In some examples, if one or more of the plurality of points on the trend line crosses the average value more than a predetermined number of times, alert 1102 may be instantiated indicating that one or more points are fluctuating above or below the mean value more than a predetermined number of times. Alerts 1102 may additionally and/or alternatively be dispersed as SMS text, e-mails, growl-style notifications, audio messages, and so on.

Other examples and variations are possible. For instance, users may annotate points on the graph and/or exclude such points from being plotted in the trendline. Options may exist for exporting the graphs to a PDF and/or combined in a report. Process control tool 1100 may implement a variety of SPC heuristics tests, such as Nelson's Rules of Statistical Control, and may be configurable by a user, individualized for a user profile, and/or configured specifically per machine and/or part being monitored. In another example, the tool 1100 may determine an average value and a standard deviation based on the collected machine data, analyze the machine data by applying one or more Nelson rules, determine an anomaly situation that violates one or more of the Nelson rules, and initiate an alert message indicating the determined anomaly. In still other examples, alert messages may be generated when one or more points exceed a tolerance range more than a predetermined number of times, where the tolerance range is defined by a lower control level value and an upper control level value. Such values may be user-defined. In still other examples, alerts 1102 may be indicative of an underperforming machine, and/or cause the monitoring application to automatically reconfigure one or more stages of the machine in an effort to reduce system downtime. Other examples are possible.

Figure 12:
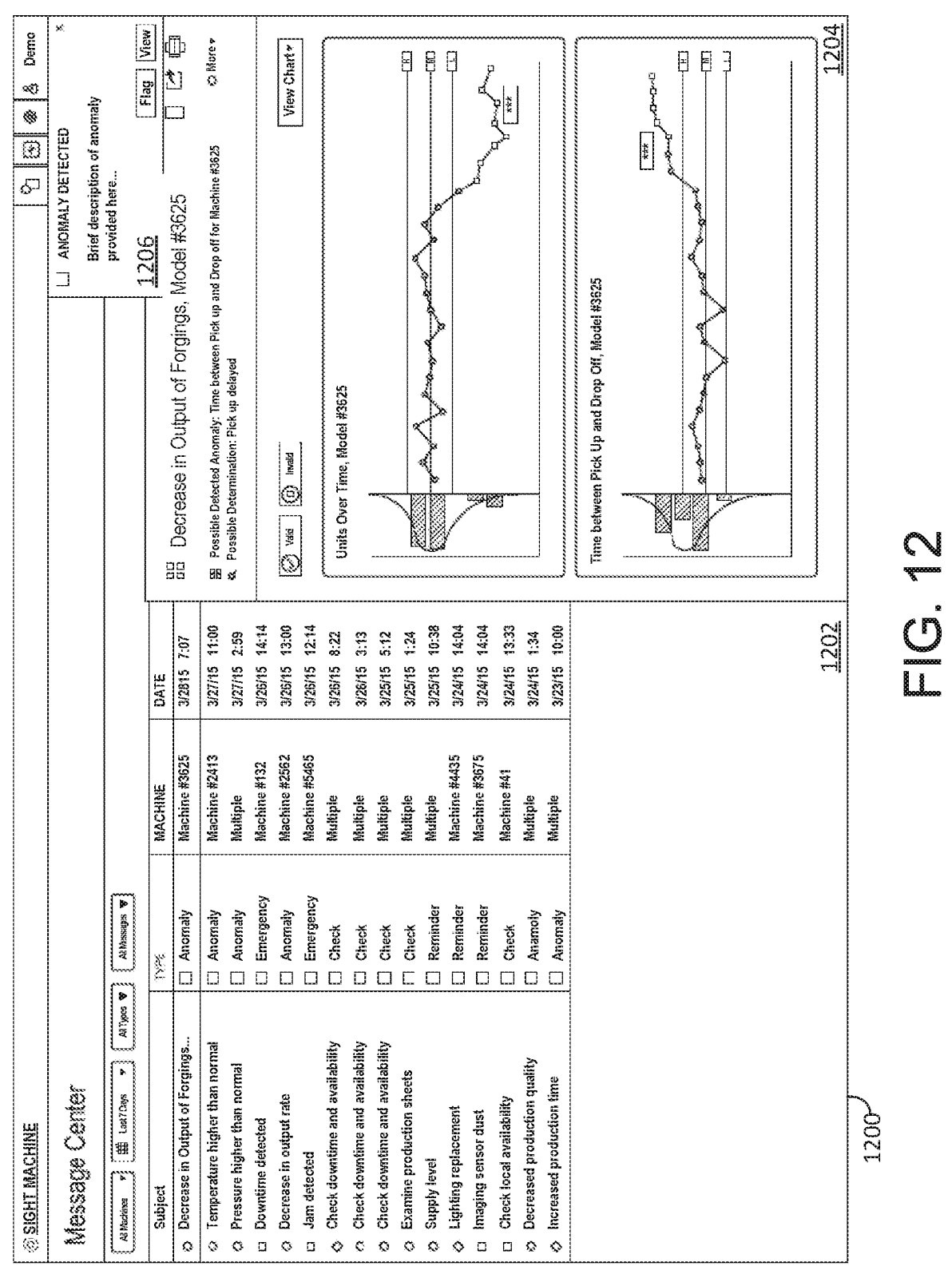

FIG. 12 depicts an exemplary screenshot of a message center 1200 according to various embodiments. Alerts may be queued in an alerts list 1202 and may be organized based on subject, type, machine, and/or date columns. Such alerts may be based on statistical process control, out of trend events, and so on, and further may be shown as a "growl"

style alert for certain operating platforms, such as OS X platform. The alerts list 1202 may further show any outgoing messages and/or alerts and allow for muting, e.g., muting as "nominal", so they do not appear again. Upon selection of an alert from the alerts list 1202, further details, such as graphs and descriptions of the alerts, may be provided in messages display 1204. Real-time alert notifications may be provided during this interface as pop-up box alerts 1206, which may also appear in the alerts list 1202.

Figure 13:
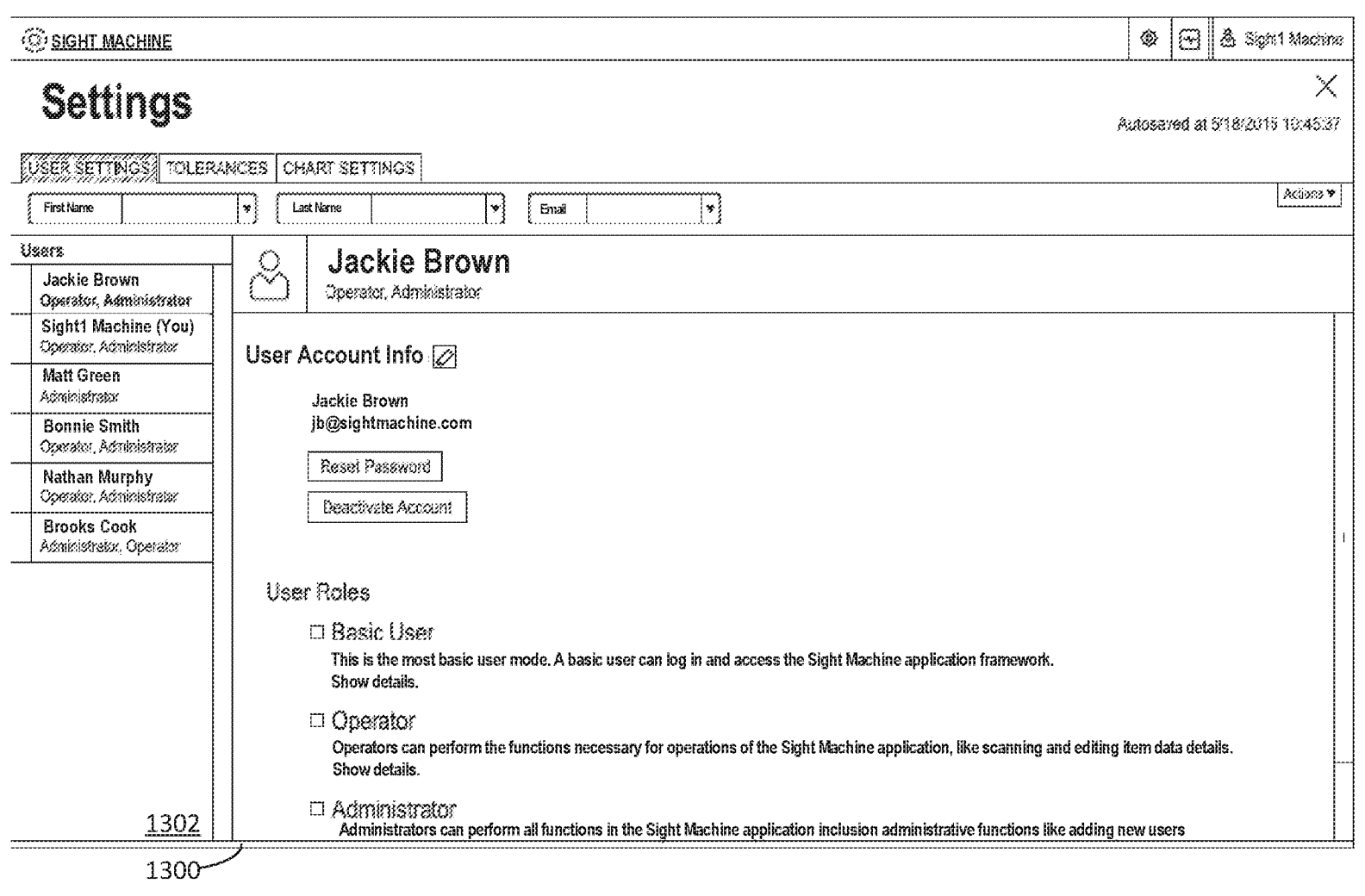

FIG. 13 depicts an exemplary screenshot of a user configuration screen according to various embodiments. Configuration screen 1300 allows creation and configuration of user accounts, as shown in user accounts list 1302, and/or management of customer-facing metadata. User accounts may be designated for permission to add tolerances, part specs, machine specs, manage downtime and/or defect codes, and/or configure shift schedules, factory operation parameters, and so on. Other examples are possible.

Figure 14:
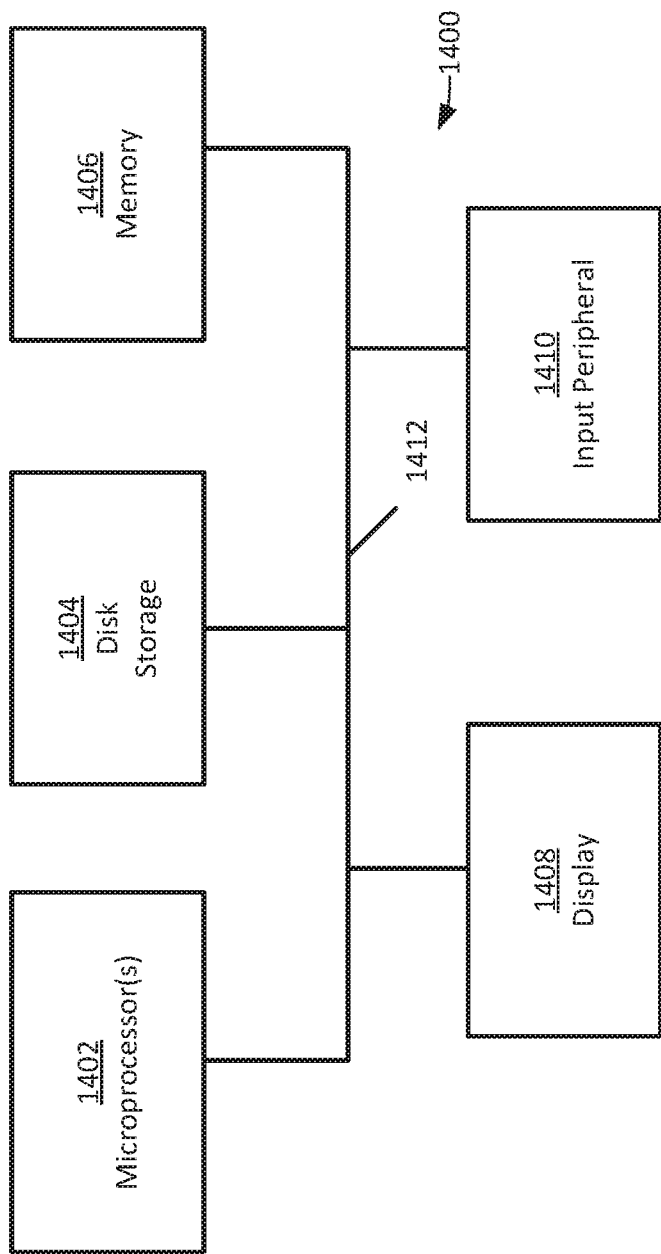
FIG. 14 shows a block diagram of a computing system upon which various features of the present disclosure may be provided.

Turning now to FIG. 14, computer system 1400 which may be used to implement the above-described embodiments is illustrated. In some embodiments, computer system 1400 includes one or more microprocessors 1402 to execute computer-readable instructions; non-transitory computer memory 1406 to store computer-readable instructions, and disk storage 1404 for storing data and computer-readable instructions; a display 1408 for displaying system outputs; and an input peripheral 1410 (e.g., keyboard, mouse, touch screen, and so on) to receive input from a user. The one or more microprocessors, memory, disk, display, and input units are connected by one or more bidirectional buses 1312 that transmit data and/or computer-readable instructions between the units.

The computer system 1400 of FIG. 14 may be used, for example, to implement any of the server 116, databases 118*a,b,c*, and/or controllers 104 of FIG. 1. Disk storage unit 1404 may be used to archive digital images or other sensed data received from one or more controllers 104 or sensors 106*a-g* and/or store user interface application features and user inputs. One or more microprocessors 1402 may be used for root cause analysis calculations, to generate and communicate alerts, and to provide other functionalities of the user interface. Memory 1406 may be used to store user interface software, statistical algorithms, computational results, queries, or other types of data or computer-readable instructions. Further, the computer system 1400 may be used to implement the remote terminal 120 of FIG. 1. In this case, the one or more microprocessors 1402 may be used to execute the user interface that is displayed on display 1408. The display 1408 may display the results of the root cause analysis, quality metrics, sensor data, system status, or other types of information related to the system 100. Input peripheral 1410 may enable the user to enter new queries or to remotely update the controller software or sensor settings. Other examples are possible.

What is claimed is:

1. A system for monitoring manufacturing, comprising:
one or more sensors; and
a controller in operative communication with the one or more sensors, wherein the controller comprises one or more processors and a memory communicatively coupled with and readable by the one or more processors and having stored therein processor-readable instructions that, when executed by the one or more processors, cause the one or more processors to:
determine a trend line comprising a plurality of points representing machine data collected from the one or more sensors over at least one of a period of time or a number of machine parts;
determine an average value for the machine data;
determine if the plurality of points on the trend line satisfy criteria that is based on a number of times that the plurality of points cross the average value; and
if the plurality of points satisfy the criteria, initiate an alert message that one or more points of the plurality of points are fluctuating above or below the average value.

2. The system of claim 1, wherein the one or more sensors comprise at least one machine data sensor and one environmental data sensor.

3. The system of claim 1, further comprising a server in operative communication with the controller and one or more remote terminals.

4. The system of claim 3, wherein the server comprises a cloud-based data server having one or more databases, and wherein the one or more databases store the machine data and environmental data collected from the one or more sensors.

5. The system of claim 1, wherein the processor-readable instructions further instructions that cause the one or more processors to:
determine a quality metric represented by machine data collected from the one or more sensors;
identify a correlation value between the machine data and environmental data collected from the one or more sensors;
determine if the correlation value exceed a predetermined threshold value; and
if the correlation value exceeds the predetermined threshold value, report at least one of the correlation value and quality metric.

6. A non-transitory computer-readable storage medium storing one or more programs, the one or more programs comprising instructions, which when executed by one or more processors of an electronic device, instruct the electronic device to:
determine a trend line comprising a plurality of points representing machine data collected from one or more machine data sensors over at least one of a period of time or a number of machine parts;
determine an average value for the machine data;
determine if the plurality of points on the trend line satisfy criteria that is based on a number of times that the plurality of points cross the average value; and
if the plurality of points satisfy the criteria, initiate an alert message that one or more points of the plurality of points are fluctuating above or below the average value.

7. The non-transitory computer-readable storage medium of claim 6, the one or more programs further comprising instructions, which when executed by the one or more processors of the electronic device, instruct the electronic device to:
determine that a quality metric represented by the machine data is indicative of a substandard quality; and
report the quality metric based on the determination.

8. The non-transitory computer-readable storage medium of claim 7, the one or more programs further comprising instructions, which when executed by the one or more processors of the electronic device, instruct the electronic device to:
compare the machine data to at least one of an average value, a lower control level value, and an upper control level value; and determine the quality metric indicates the substandard quality based on the comparison.

9. The non-transitory computer-readable storage medium of claim 8, wherein:
the average value, the lower control level value, and the upper control level value define a tolerance range for a part being manufactured; and
the substandard quality represents the machine data exceeds the tolerance range.

10. The non-transitory computer-readable storage medium of claim 7, the one or more programs further comprising instructions, which when executed by the one or more processors of the electronic device, instruct the electronic device to:
receive a user request for a root cause analysis based on the determination that the quality metric is indicative of the substandard quality; and
identify and report a correlation value between the machine data and environmental data collected from one or more environmental data sensors in response to the user request.

11. The non-transitory computer-readable storage medium of claim 6, the one or more programs further comprising instructions, which when executed by the one or more processors of the electronic device, instruct the electronic device to:
receive a user request for at least one of a correlation value between the machine data and environmental data collected from one or more environmental data sensors and a quality metric represented by the machine data; and
report at least one of the correlation value and the quality metric in response to the user request.

12. The non-transitory computer-readable storage medium of claim 6, the one or more programs further comprising instructions, which when executed by the one or more processors of the electronic device, instruct the electronic device to analyze environmental data collected from one or more environmental data sensors and the machine data using a regression analysis to identify a correlation value between the machine data and environmental data.

13. The non-transitory computer-readable storage medium of claim 6, the one or more programs further comprising instructions, which when executed by the one or more processors of the electronic device, instruct the electronic device to retrieve data representing at least one of environmental data collected from one or more environmental data sensors and the machine data from a network database.

14. The non-transitory computer-readable storage medium of claim 6, the one or more programs further comprising instructions, which when executed by the one or more processors of the electronic device, instruct the electronic device to:
determine the one or more points exceed a tolerance range more than a predetermined number of times, wherein the tolerance range is defined by a lower control level value and an upper control level value; and
based on the determination, generate an alert message indicating that the one or more points exceed the tolerance range.

15. The non-transitory computer-readable storage medium of claim 6, the one or more programs further comprising instructions, which when executed by the one or more processors of the electronic device, instruct the electronic device to:
determine an average value and a standard deviation based on the machine data;
analyze the machine data by applying one or more Nelson rules and at least one of the average value and the standard deviation;
determine an anomaly situation based on the analysis, wherein the anomaly situation indicates a violation event of the one or more Nelson rules; and
initiate an alert message indicating the determined anomaly situation.

16. The non-transitory computer-readable storage medium of claim 6, the one or more programs further comprising instructions, which when executed by the one or more processors of the electronic device, instruct the electronic device to:
determine an outcome variable based on a correlation value between the machine data and environmental data collected from one or more environmental data sensors, wherein the outcome variable comprises a variable type that is at least one of a categorical variable and an ordinal variable, wherein the variable type of the outcome variable is based at least in part on a user request for a root cause analysis; and
report the outcome variable.

17. The non-transitory computer-readable storage medium of claim 6, the one or more programs further comprising instructions, which when executed by the one or more processors of the electronic device, instruct the electronic device to:
map the machine data to one or more particular manufactured parts; and
report the one or more particular manufactured parts along with at least one of a correlation value between the machine data and environmental data collected from one or more environmental data sensors and a quality metric represented by the machine data.

18. The non-transitory computer-readable storage medium of claim 6, the one or more programs further comprising instructions, which when executed by the one or more processors of the electronic device, instruct the electronic device to:
optimize a monitored assembly line based on a correlation value between the machine data and environmental data collected from one or more environmental data sensors by:
determining one or more parallel subassembly processes of the monitored assembly line; and
prioritizing the one or more parallel subassembly processes in the monitored assembly line based at least in part on environmental data collected from one or more environmental data sensors and the machine data so that a production time length of the monitored assembly line is reduced.

19. The non-transitory computer-readable storage medium of claim 6, the one or more programs further comprising instructions, which when executed by the one or more processors of the electronic device, instruct the electronic device to:
determine a quality metric represented by machine data collected from the one or more sensors;
identify a correlation value between the machine data and environmental data collected from the one or more sensors;
determine if the correlation value exceed a predetermined threshold value; and if the correlation value exceeds the predetermined threshold value, report at least one of the correlation value and quality metric.

20. A computer-implemented method for monitoring manufacturing, the method comprising:
determining a trend line comprising a plurality of points representing machine data collected from one or more machine data sensors over at least one of a period of time or a number of machine parts;
determine an average value for the machine data;
determine if the plurality of points on the trend line satisfy criteria that is based on a number of times that the plurality of points cross the average value; and
if the plurality of points satisfy the criteria, initiate an alert message that one or more points of the plurality of points are fluctuating above or below the average value.

* * * * *